(12) United States Patent
Musgrave et al.

(10) Patent No.: US 9,823,753 B2
(45) Date of Patent: Nov. 21, 2017

(54) SYSTEM AND METHOD FOR USING A SIDE CAMERA FOR FREE SPACE GESTURE INPUTS

(71) Applicant: Dell Products, LP, Round Rock, TX (US)

(72) Inventors: Kenneth C. Musgrave, Austin, TX (US); Deeder M. Aurongzeb, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/493,027

(22) Filed: Apr. 20, 2017

(65) Prior Publication Data

US 2017/0220127 A1    Aug. 3, 2017

Related U.S. Application Data

(63) Continuation of application No. 15/071,073, filed on Mar. 15, 2016, now Pat. No. 9,658,699, which is a continuation of application No. 14/224,260, filed on Mar. 25, 2014, now Pat. No. 9,317,129.

(51) Int. Cl.
*G06F 3/01* (2006.01)
*G06F 1/16* (2006.01)
*G06F 3/042* (2006.01)

(52) U.S. Cl.
CPC ............ *G06F 3/017* (2013.01); *G06F 1/1686* (2013.01); *G06F 3/0425* (2013.01)

(58) Field of Classification Search
CPC .................. G06F 3/04883; G06F 2203/04808
See application file for complete search history.

(56) References Cited

U.S. PATENT DOCUMENTS

| | | |
|---|---|---|
| 8,169,406 B2 | 5/2012 | Barney et al. |
| 9,317,129 B2 | 4/2016 | Musgrave |
| 2008/0120577 A1 | 5/2008 | Ma |
| 2009/0278801 A1 | 11/2009 | Cheng |
| 2010/0031202 A1 | 2/2010 | Morris et al. |
| 2014/0149754 A1 | 5/2014 | Silva |
| 2014/0201689 A1 | 7/2014 | Bedikian |
| 2014/0300554 A1* | 10/2014 | Samuel .................. G06F 21/32 345/173 |

\* cited by examiner

*Primary Examiner* — Gerald Johnson
(74) *Attorney, Agent, or Firm* — Prol Intellectual Property Law, PLLC; H. Kenneth Prol

(57) ABSTRACT

An information handling system including a camera mounted in the side edge surface for detecting gestures by a user on a detected working surface in a gesture detecting zone next to the system and including a gesture detection system for interpreting free space gestures and initializing cursor control commands.

20 Claims, 7 Drawing Sheets

SYSTEM AND METHOD FOR USING A SIDE CAMERA FOR FREE SPACE GESTURE INPUTS

CROSS REFERENCE TO RELATED APPLICATIONS

This application is a continuation of U.S. patent application Ser. No. 15/071,073, entitled "System and Method for Using a Side Camera for Free Space Gesture Inputs," filed on Mar. 15, 2016, which is a continuation of U.S. patent application Ser. No. 14/224,260, entitled "System and Method for Using a Side Camera for a Free Space Gesture Inputs," filed on Mar. 25, 2014, now issued U.S. Pat. No. 9,317,129, issued Apr. 19, 2016, the disclosures of which are hereby expressly incorporated by reference in their entirety.

FIELD OF THE DISCLOSURE

This disclosure generally relates to a system for utilization of one or more integrated cameras for free space mouse gesture input and track pad function, and more particularly relates to a side mounted camera used for detection of input gestures with or without a projection plane.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. Information handling systems may include a variety of hardware and software components that may be configured to process, store, and communicate information and may include one or more computer systems, data storage systems, and networking systems. Additionally, information handling systems may have one or more display screens for output of images and for input such as by touch screen operation. Information handling systems typically utilize one or more input devices for cursor control such as mouse systems, track pads, trackball systems, and similar cursor control devices. Additional input devices such as touchscreens and alpha numeric input devices such as keyboards are also used. Cursor control systems may require additional equipment be available for use in connection with the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
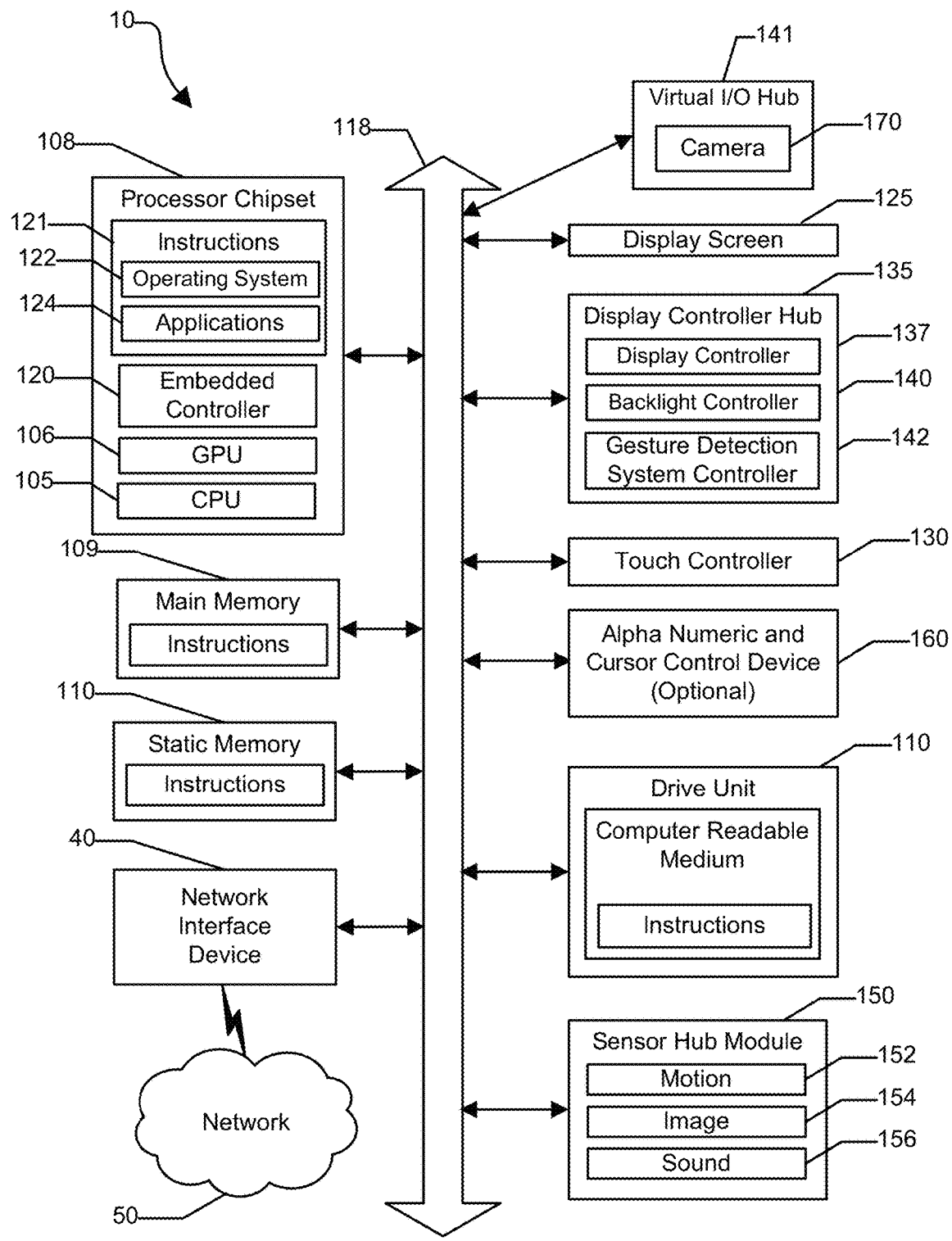
FIG. 1 is a hardware block diagram illustrating an information handling system having a camera according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or the similar data exchange partners. These enterprise systems also interface with individual users. Individual users also use sophisticated computing systems to facilitate working software application contexts such as running office applications for database creation and word processing, note taking, accessing internet data applications, gaming, video playback entertainment, video and voice communications, email and other electronic communication, websurfing, music, mobile applications, and other media accesses. Much of present day information exchange is conducted electronically, via communications networks. Currently, a high degree of media entertainment and other applications are utilized and accessed electronically by users. For portable information handling systems, a need arises for efficient and compact input-output capabilities to accept user commands without substantial impact to extended display capabilities to facilitate broad range of usage by users.

Additionally, traditional information handling system input devices such as keyboards, mouse, track pad and track ball systems are giving way alternative input systems. Some examples include visual input interfaces such as touchscreens, hover detection, and motion sensing technologies. Among the motion sensor technologies includes vision systems that may include a gesture detection camera or multiple sensors such as an image sensor and a camera to detect gestures as with the present disclosures. It is substantially beneficial to implement integrated vision sensor systems in an information handling system to provide an alternative input interface to existing input hardware or, alternatively, eliminate or reduce input hardware needed with the information handling system. Utilization of this vision sensor technology including gesture detection camera and image sensor with depth calibration as disclosed herein will enable free space gestures. The image sensor with depth calibration may comprise a second camera for detecting a virtual detection plane in a comfortable spot selected by the user. In particular, the free space gestures may be those similar to mouse or track pad gestures for cursor control or graphical user interface element selection or manipulation. This optimal utilization camera sensors and image sensor and variations on those provide benefits for compactness and thin architecture of information handling systems. Additionally it can reduce cost of and the need for additional input hardware.

Free space gesture processing may detect and interpret gestures in three dimensions, or alternatively, may detect and interpret largely two dimensional free space gestures. Three dimensional gesture processing applications may be slower and more power consuming than two dimensional gesture processing. Two dimensional gesture technology is simpler and may consume less power and processor capacity. Two dimensional gesture technology may still have some third dimensional components including an additional image sensor such as a second camera for detecting gesture components that utilize an additional dimension to indicate a particular actions. For example, a click or scroll type movement may not be strictly in two dimensions. In certain embodiments, a virtual gesture detection plane is beneficial for utilization of two dimensional gesture processing. Additionally, it is understood that the detection plane for two dimensional gesture processing may allow for some variation due to variation of movement by a user or unevenness of a surface upon which the detection plane may be projected. Depth calibration by the gesture detection camera or a second image sensor or camera may calibrate the virtual gesture detection plane to a comfort zone and angle settled into by a user.

The virtual gesture detection plane may be projected onto a surface such as a table top, counter, or other working surface as the location for gestures to be detected by the vision sensors including the camera system in some embodiments. An actual projected surface via a laser projection system or LED light projection integrated into the information handling system or even integrated with the camera may be used to project delineation of the two dimensional gesture detection plane onto a working surface of the user. In certain embodiments, a camera and depth sensor are located on the side of the information handling system for the purpose of detecting the free space gestures. Additionally, a laser or LED projection system may similarly be mounted on the side of the information handling system for projection to a delineate a gesture detection plane boundary. Two and three dimensional gesture detection and processing are described in further detail below by way of several embodiments of the same.

In other embodiments, the projection plane may be projected in free space with a plane selected for detection of the two dimensional gestures. In this embodiment, a working surface is not necessary. Due to expected variations in free space by the user and difficulty maintaining the same approximate working plane for gestures, the system may include a projection plane adjustment system for two dimensional gesture detection and processing to adjust to variations. This gesture projection plane adjustment system is also described in further detail below.

The current disclosed embodiments describe a system and method for locating an integrated camera, depth sensor and detection plane projection system along a side of an information handling system. Inputs from several sensors including the camera, depth sensor, and orientations sensors determine the gesture detection plane. Such a gesture detection plane is determined based on detection of key components of a user indication device such as a user's hand, fingers, or a stylus. The gesture detection plane will also depend on the gesture mode classification selected.

Embodiments of the current disclosure also provide methods and systems for controlling the detection of gestures and correction or adjustment of a gesture detection plane in accord with orientation of the information handling system, the user's hand and fingers performing gestures, and in certain embodiments a working surface upon which a gesture detection plane may established. Either two dimensional or three dimensional cameras may be used. A 3D camera typically has depth capability as is understood in the art. A 2D camera or 3D camera or both may be integrated in the vision system described below. A 2D camera may be included with a 3D camera in the vision system as a lower power or lower processing cost solution during certain operating modes. Alternatively, a separate image sensor such as another camera may be used for depth perception purposes. For example, a virtual touchpad type mode may include depth perception that may be used to track finger tips moving back and forth in free space gestures.

FIG. 1 shows an information handling system 10 including conventional information handling systems components. This information handling system may be a mobile device and of a type typically found in client/server computing environments. The FIG. 1 block diagram shows the information handling system 10 with camera 170 capable of administering each of the specific embodiments of the present disclosure. The information handling system 10 can include a set of instructions that can be executed to cause the computer system to perform any one or more of the methods or computer based functions disclosed herein.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a tablet, a PDA/smartphone, a consumer electronic device, a network server or storage device, a switch router, wireless router, or other network communication device, or any other suitable device and may vary in size, shape, performance, functionality, and price. In a particular embodiment, system 10 can be implemented using electronic devices that provide voice, video or data communication. In a networked deployment, the information handling system 10 may operate in the capacity of a server or as a client user computer in a server-client user network environment, or as a peer computer system in a peer-to-peer (or distributed) network environment. Further, while a single information handling system 10 is illustrated, the term "system" shall also be taken to include any collection of systems or sub-systems that individually or jointly execute a set, or multiple sets, of instructions to perform one or more computer functions.

The information handling system may include memory 109, one or more processing resources such as a central processing unit (CPU) 105 or hardware or software control logic, and operates to execute code. Additional components of system 10 may include main memory 109, one or more storage devices such as static memory or disk drives 110. These memory devices 109, 110 can store code and data. Other components include one or more communications ports for communicating with external devices as well as various input and output (I/O) devices. I/O devices may include alphanumeric and cursor control devices 160 such as a keyboard, a touchpad, a mouse, one or more video display devices 125, display touchscreen(s) with touch controllers 130, and one or more cameras 170 including camera controllers. The information handling system may also include one or more buses 118 operable to transmit communications between the various hardware components.

The information handling system may include one or more processing resources such as a central processing unit (CPU) 105, a graphics processing unit (GPU) 106 that may or may not be integrated with a CPU 105, and related chipset(s) 108 or hardware or software control logic. System 10 may include several sets of instructions 121 to be run by CPU 105, GPU 106, and any embedded controllers 120 on system 10. One such set of instructions includes an operating system 122 with operating system interface. Example operating systems 122 can include those used with typical mobile computing devices such as Windows Phone mobile OS from Microsoft Corporation and Android OS from Google Inc., for example Key Lime Pie v. 5.x. Additional sets of instructions in the form of multiple software applications 124 may be run by system 10. These software applications 124 may enable multiple uses of the information handling system as set forth in more detail below. Applications 124 may include applications involving use of the display device 125 as well as peripheral systems such as a camera 170 as described further herein. Application 124 may further include systems and methods for coordinating the display of images via the thin panel display and operating the camera 170 through the thin panel display as described in more detail herein. System 10 can also include a signal generation device or receiving device, such sound sensors 156, remote control, and a network interface device 40.

System 10 may operate as a standalone device or may be connected such as by using a network, to other computer systems or peripheral devices. System 10 can represent a server device whose resources can be shared by multiple client devices, or it can represent an individual client device, such as an individual mobile personal computing system. More specifically, system 10 represents a mobile user/client device, such as a mobile tablet computer, smartphone, or laptop. System 10 has a network interface device 40, such as for a wireless cellular or mobile networks (CDMA, TDMA, etc.), WIFI, WLAN, LAN, or similar network connection, enabling a user to communicate via a wired or wireless communications network 50, such as the Internet. System 10 may be configured with conventional web browser software. The web browser may include for example Microsoft Corporation's Internet Explorer web browser software, Firefox or similar such browsers to allow the user to interact with websites via the wireless communications network 50.

System 10 also includes one or more display devices 125 that may utilize LCD, OLED, or other thin film technologies. Each display device 125 may be capable of touch input via touch controller 130. Each display device 125 has a display controller hub 135. The display controller hub 135 may include control logic and software or access separate control logic and software. Components may include a display controller or driver 137 and a backlight controller 140 for LCD thin film display technologies or a brightness controller for OLED/AMOLED technologies. The one or more parts of the display controller hub 135 may be operated by or integrated with one or more graphics processing units (GPUs) 106 such as those that are part of the chipset 108. The display device 125 and one or more parts of the display controller hub 135 may also be controlled by the embedded controller 120 of chipset 108. Each GPU 106 and display controller/driver 137 is responsible for rendering graphics such as software application windows and virtual tools on the display device 125.

The information handling system 10 may include one or more integrated camera systems 170 with one or more camera drivers. Some cameras 170 may operate in accordance with normal usage as a webcam or such as those that may be mounted on a back surface for standard image taking with the information handling system 10. Image taking or image capture can refer to any type of camera operation whether still image capture, video, or other functions or for other purposes. Alternatively, any one or all of camera(s) 170 may be used as part of a virtual I/O device hub 141 to capture images of gesture as part of the disclosure embodiments described below. Camera(s) 170 may be part of or connected to the virtual I/O device hub 141 for those having free space gesture capture capabilities. For example, the side mounted camera or other camera operating as an I/O input device for gestures may also have a dual function and be used for image capture purposes in other embodiments. However not all cameras may be associated with the virtual I/O device hub 141 depending on the embodiment. Some or all of the camera(s) 170 may be infrared (IR) cameras or near-infrared cameras for use in low light or other difficult light settings or camera(s) 170 may operate in a typical visible light spectrum. It should be noted that camera(s) mounted in other locations may similarly act as virtual I/O input devices with the virtual I/O device hub 141 to capture free space gestures according the systems and methods disclosed in embodiments herein.

Additional functionality may be integrated in the information handling system to work in connection with the virtual I/O input hub 141 to enhance functionality in some embodiments. Such additional hardware may include an image sensor or proximity sensor, such as a low resolution IR or near IR camera, to detect a user's hand location and movement. Additionally, a second camera or IR system may act as a depth sensor to detect location of a hand and orientation of palm and fingers in proximity to the camera and the information handling system. Thus, a second camera may be the additional image sensor hardware. The cameras 170 may also be capable of capturing either two dimensional or three dimensional imagery of gesture actions and may incorporate multiple image capture components or cameras 170 as necessary to capture gesture images for interpretation to commands. Also, projection of a gesture boundary via a laser or LED projection system may be employed as additional hardware integrated into the information handling system. Further description of the camera virtual I/O input device system is described below as is additional description of additional integrated functionality and hardware for use in conjunction with the gesture detection camera for I/O inputs to the information handling system 10.

In one embodiment, the gesture detection camera and gesture detection system 142 operate to detect and interpret the gesture for I/O input. The gesture detection system 142 may be code run on one or more processors in the information handling system. Such a system to support camera gesture detection for I/O input may operate on the CPU 105 or GPU 106 via the chipset 108. Alternatively, the gesture detection system 142 may be firmware or software code instructions operating on a separate controller or processor. For example, the gesture detection system 142 may operate on or in close connection with the gesture detection camera and its associated camera controller.

The gesture detection system 142 operates to identify a user's hand and elements of the user's hand relevant to the gestures including a palm and one or more fingers that may perform gestures. The gesture detection system 142 interprets gesture movements by a user's hand into commands for selection and manipulation of a cursor or elements displayed by an operating system 122 or application 124 running on the information handling system. In an example embodiment, the gesture detection system 142 may also maintain a gesture detection plane and hand orientation. In another embodiment, the gesture detection system 142 may detect the operating system 122 or applications 124 to be run on the information handling system 10. This is done to determine what type of gestures may need to be supported for I/O input functions like cursor control.

System 10 of the current embodiment also has a system sensor module 150. Various orientation sensors are included in this module to assist with determining the relative orientation of the information handling system. Subcategories of orientation sensors include motion sensors 152, image sensors 154, and sound sensors 156. Sensor system module 150 is a sensor hub, or an accumulator device, that collects raw data from connected orientation sensors, and organizes and processes data received from the connected sensors. Such a sensor hub may be an independent microcontroller such as the STMicro Sensor Fusion MCU as well as other microcontroller processing systems known to persons of ordinary skill. Alternatively, it is contemplated that the sensor and fusion hub may be integrated into a core processing chipset such as CPU systems for mobile devices as available from Intel® corporation or may utilize ARM Core processors that serve as single or multiple core processors in alternative chipset systems. The sensor hub may communicate with the sensors and the main CPU processor chipset via a bus connection such as an Inter-Integrated Circuit (I2C) bus or other suitable type of multi-master bus connection. Sensor data may impact location of expected free space gestures and orientation of a gesture detection boundary and gesture detection plane.

Figure 2:
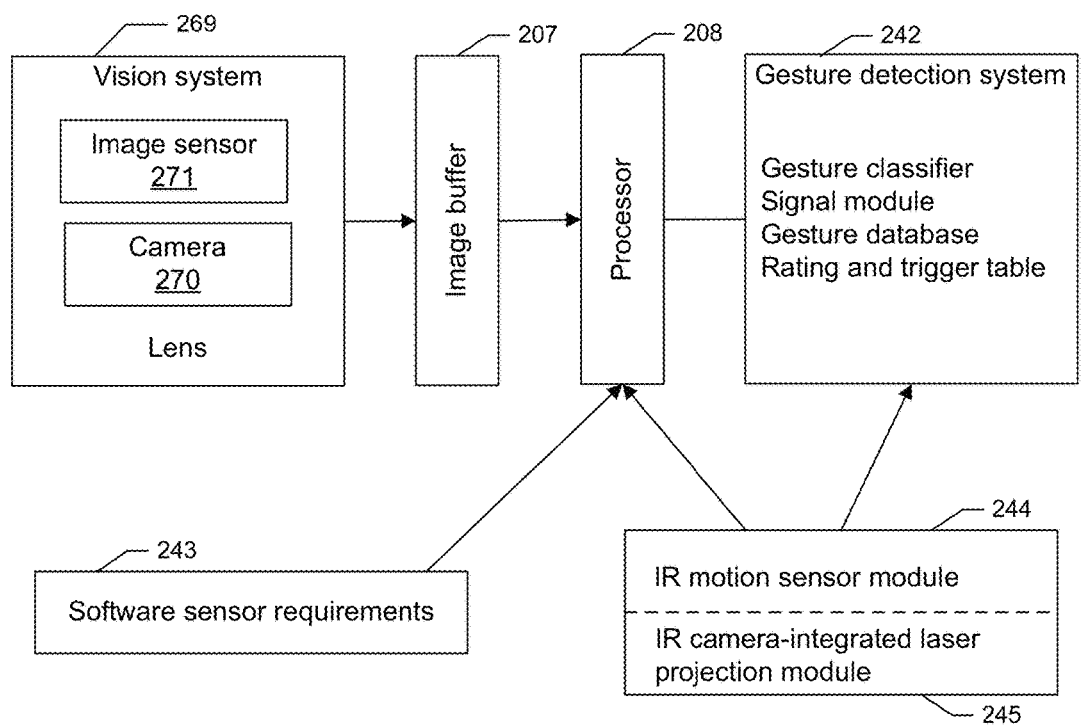
FIG. 2 illustrates a block diagram illustrating the hardware devices involved in capturing free space gestures for input via side camera according to an embodiment of the present disclosure.

FIG. 2 illustrates a system block diagram of a subset of elements 20 of an information handling system 10 that may work with virtual I/O device hub 141 to enable free space gesture inputs. This subset including hardware, firmware, and software elements for controlling a vision system 269 including camera 270 and image sensors 271. System 20 executes code in software or firmware on processor chipset(s) 208 for gesture detection and interpretation by the gesture detection system 242 and coordinates gesture images and data from vision system 269. Alternatively, the code in software or firmware may be executed on a separate processor or microcontroller or may be hard coded into an ASIC designed to perform some or all of the operations of the gesture detection system 242, software application sensor system requirement module 243, and to control the vision system 269.

Camera 270 and image sensor 271 of vision system 269 calibrate a detection zone and gesture detection plane. Additionally, camera 270 and image sensor 271 may detect and capture images of gestures for input to a virtual I/O hub. These images are buffered in image buffer 207 and then provided to processor chipset 208 or other processing device as needed by the gesture detection system 242. Gesture detection system 242 may include several subcomponents in an example embodiment as shown in FIG. 2 that may be used to interpret the free space gesture images captured by the vision system 269. Software application sensor system requirement module 243 determines the type of gestures supported by the active software application running on the information handling system at the time virtual I/O inputs are being used. For example, the system determines whether cursor control functions such as clicks, item selection, scrolling, highlighting, drawing, writing, and other I/O functions are available.

Gesture detection system 242 may include a gesture classifier to determine the type of gesture being detected. Examples of gesture types available include orientation of the gesture such as whether gestures are being received by a left hand or right hand or if the free space gestures are being input in a hover position over the center of the device. Additional classification may include the type of user indication device being used to perform free space gestures for input. User indication devices may include a user's hand, pen or pencil, stylus or similar devices. Classification of gestures may also depend on the category of gestures being received. For example, one gesture detection category may be determined to be virtual mouse gestures based on the gesture images captured. Detection of a virtual mouse click or the slide of a palm on a gesture detection plane may indicate virtual mouse gestures. Another example classification may include virtual trackpad inputs such as a detection of a finger touch and finger lateral movement on a gesture detection plane.

Gesture detection system 242 may include a signal module to take the buffered images of vision system 269 and provide interpretation by sequencing images in preparation for rating and comparison with images stored in a gesture database. Gesture database may have data representing multiple gestures available within a classification. For example, a right hand virtual mouse gesture classification may include palm slides, virtual mouse clicks, virtual click and hold, virtual scroll wheel and other gestures. Additional database entries may include classifications for virtual touchpad gestures or pen/pencil/stylus gestures. A virtual touchpad gesture may include one finger touch, multiple finger touches, touchpad clicks, and virtual touches to activation buttons as are understood by those of ordinary skill in the art as mimicking actual touchpad technology.

Variations to virtual mouse or virtual touchpad modes for the convenience of the user's or to improve upon the limitations of the mimicked actual I/O devices in certain embodiments. For example, additional gestures are possible including variations from a typical mouse or typical touchpad operation. This may include virtual clicks or virtual finger touches with different fingers or multiple fingers or other detectable movements of the user's hand. A separate set of gestures may be stored in the gesture database for each of the gesture classification. For example, a similar set of virtual mouse gestures or virtual trackpad gestures may be available for a user's left hand from a left side mount camera or a re-oriented information handling system such as a tablet or other mobile device. Yet another set of virtual mouse gestures may be available for a center hover position or other positions for gestures from either hand.

The gesture detection system 242 may also include a rating and trigger table. Once a gesture classification is determined according to motion of a user's hand or other user indication device, the captured images of the gesture are compared with data for the gestures in that classification from the gesture database. A rating is assigned to the gesture based on its correspondence to the stored gesture from the gesture database. If the rating of the gesture motion from the images meets a threshold, the detected free space gesture triggers an action in the information handling system. The action may be cursor control or selection of an element of a software application running on the information handling system. Other actions may include those allowed in the detected application software running on the information handling system as determined by the software sensor requirement module 243.

In another embodiment, the virtual input/output hub 141 may further include sensory inputs such as infrared (IR) motion sensor module 244. The IR motion sensor module 244 detects proximity of a hand or pen or other user indication device near the side mounted camera 270. In detecting proximity of a user preparing to input into the information handling system via the virtual I/O hub with an IR motion sensor module 244, the side camera 270 need not be always on. This has several benefits, including power savings since proximity sensing with the IR motion sensor may require less power to operate. The IR motion sensor module 244 triggers the system to begin to calibrate and detect gestures for input into the virtual I/O and capture of gesture images for interpretation by the gesture detection system in accordance with the disclosures herein. It is understood that variations on the several example disclosures herein are possible for a gesture detection system and the virtual I/O hub devices to calibrate, detect, capture and interpret free space gestures for input to an information handling system.

A laser projection module 245 may be integrated with the IR camera used with the IR motion sensor module 244. In one embodiment, laser projection module 245 shines a laser on a hand or other user indication device near the side mounted camera 270 at a plurality of points. In one embodiment, two laser points are shined. It is understood, more than two laser points may be used for additional accuracy and information, for example, four laser points may be used in an alternative embodiment. Using the laser points from the laser detection module, the IR camera may detect motion of the user's hand or other gesture indication device including direction vectors, velocity, acceleration and other dimensional movement. If the movement detected using the laser projection module 245 and IR motion sensing module 244 meets some threshold of detected motion in the free space gesture zone of the side mounted camera 270, the system initiates and the side mounted camera 270 may be turned on. An example threshold may be a detected velocity of the hand or user indication device that meets a threshold velocity of 1 foot/second. Velocity, acceleration and direction vectors may be components of contemplated thresholds required to trigger the gesture detection system via the virtual I/O hub.

Laser projection module 245 may be integrated with the IR camera of IR motion sensor module 244 or may be a separate device of the information handling system. In addition to the embodiment above, a laser projection module 245, whether or not integrated with the IR camera, may also be used to project virtual working boundaries of a virtual gesture detection plane in accordance with the disclosures further described herein.

In another embodiment projection module 245 may not necessarily be laser light projection. A light projection module 245 may be in its place. For example, a LED or other light source may be used to approximately illuminate the virtual gesture detection plane for free space gestures. In one embodiment, this light may be focused, for example variably focused, to approximate a virtual working boundary for free space gestures.

Coordination of the vision system 269, gesture detection system 242, and IR motion sensor module 244 of the virtual I/O hub involves control of the camera 270 and gathering of gesture images for interpretation by the gesture detection system 242 operating via processors such as processor or chipset 208. Coordination occurs via instructions running on or between elements of the processor chipset or an external controller such as an MCU associated with the gesture detection system 242. This may include CPU, embedded controllers, and camera controllers, executing all or parts of instructions for capturing free space gesture images for interpretation into information handling system control commands such as cursor control. The CPU 205, embedded controller, MCU, camera controllers or other processors may coordinate via the information handling systems application programming interface (API). The API coordinates the various elements of code run on one or more processors in the chipset or controllers associated with the elements of vision system 269, their drivers, and the gesture detection system 242. These code elements may comprise the systems or perform the methods described herein that comprise the disclosed methods and systems including several features of the gesture detection system 242, the IR motion sensor module 244 operation, software sensor requirements and other elements of the virtual I/O hub.

Figure 3:
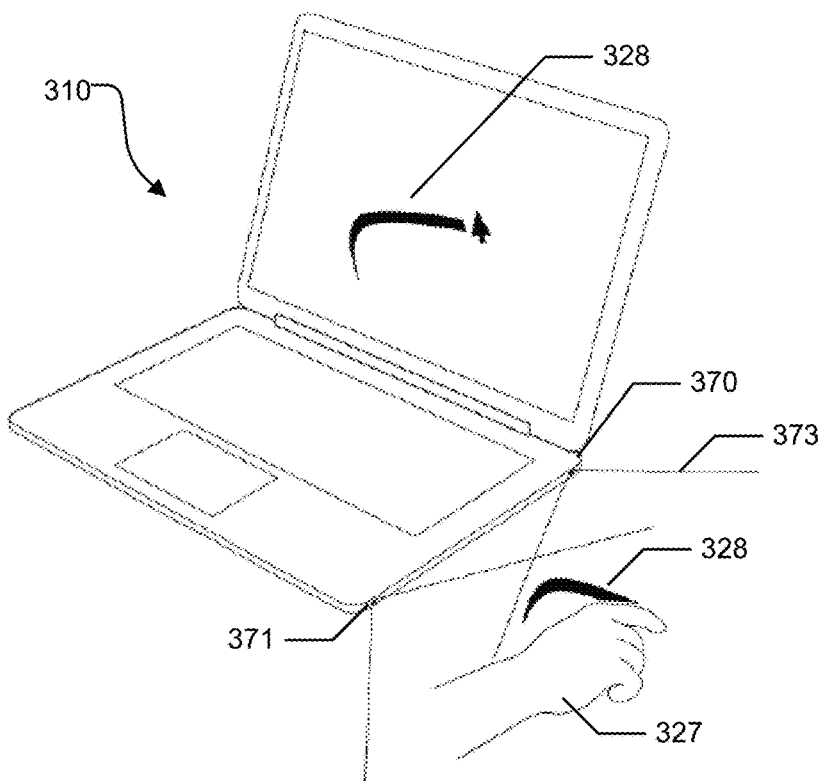
FIG. 3 illustrates an example information handling system with side camera according to an embodiment of the present disclosure.

FIG. 3 shows an example of an information handling system 310 with side mount camera 370 and image sensor 371. FIG. 3 is not drawn to scale. For example, the size of the camera and proximity of the side mount camera 370 and image sensor 371 may vary and the location these elements may be changed or altered to the opposite side of the information handling system 310 as is understood by one of ordinary skill in the art. The detection zone 373 is shown to the side of the information handling system 310, but may be located on either the right side, left side, hover center, or at another location selected to be before the camera 370 and image sensor 371 of the vision system. Additional aspects of the vision system may not be shown in this embodiment including the IR motion sensor module and laser projection module.

The user indication device 327, in the shown embodiment the user's hand, is shown performing a free space gesture 328. In one embodiment, the side mount camera 370 is located along a side edge of an example laptop computer. The side mount camera 370 may be located on either the left or right side. In an alternative embodiment, the free space gestures may be made in space at the center of the information handling system 310, for example over the keyboard. In that embodiment, a side mount camera 370 may still be used to detect center or right-center gestures if they fall within a view field of side mount camera 370. Alternatively, one or more of the vision system components such as the camera 370 and image sensor 371 may be located on the front surface of the information handling system such as in the thin panel display or the keyboard housing for use hover gesture detection that is not to either side of the information handling system.

Free space gesture 328 corresponds to a cursor movement 329 by way of virtual I/O control using the gesture detection system and the methods described herein. Images of the free space gesture 328 are detected and captured by the vision system side mount camera 370 and image sensor 371 for interpretation and transformation into cursor control commands. The free space gestures 328 may be made in relation to a free space gesture plane established via a 3D side mount camera 370 or via a 2D side mount camera. The gesture detection system and virtual I/O hub may establish and calibrate a gesture detection plane in the detection zone 371 in free space or based on a detected physical surface such as one that the information handling system 310 is resting on in alternative embodiments.

Figure 4:
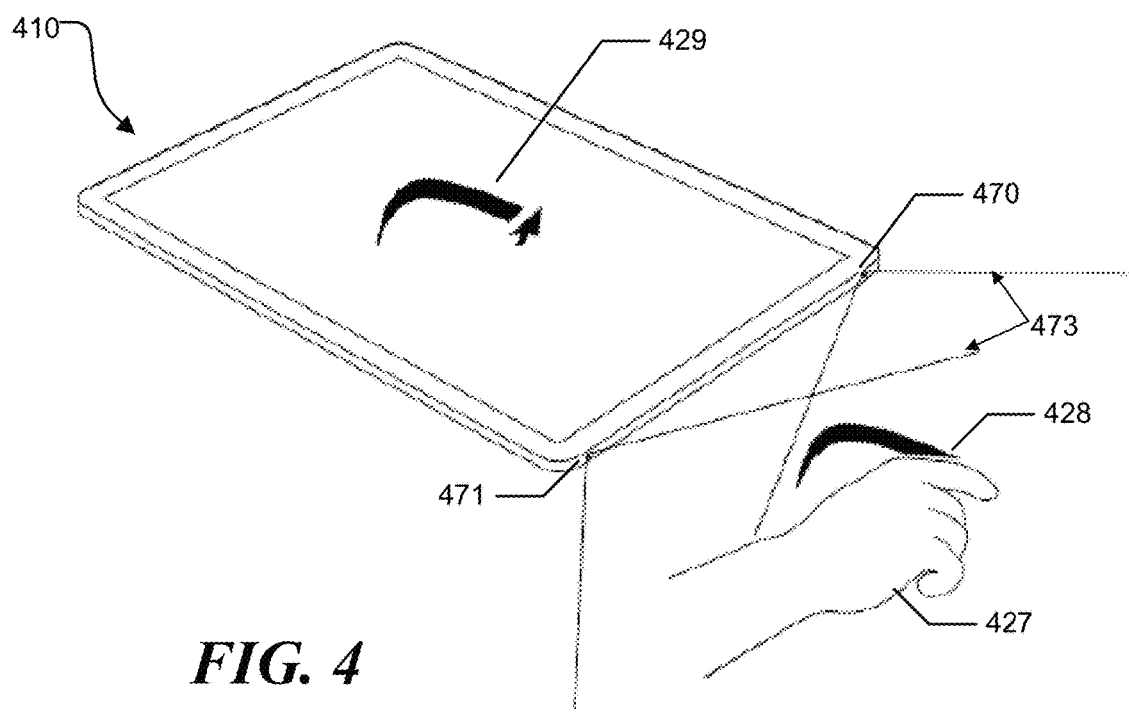
FIG. 4 illustrates an another example information handling system with side camera according to an embodiment of the present disclosure.

FIG. 4 shows another example of an information handling system 410 with side mount camera 470 and image sensor 471. FIG. 4 is not drawn to scale. For example, the size of the camera and proximity of the side mount camera 470 and image sensor 471 may vary and the location these elements may be changed or altered to the opposite side of the information handling system 410 as is understood by one of ordinary skill in the art. The detection zone 473 is shown to the side of the information handling system 410, but may be located on either the right side, left side, hover center, or at another location selected to be before the camera 470 and image sensor 471 of the vision system. Additional aspects of the vision system may not be shown in this embodiment including the IR motion sensor module and laser projection module.

The user indication device 427, in the shown embodiment the user's hand, is shown performing a free space gesture 428. In one embodiment, the side mount camera 470 is located along a side edge of an example tablet computer. The side mount camera 470 may be located on the left, right, top, or bottom side edge. In an alternative embodiment, the free space gestures may be made in space at the center of the information handling system 410, for example over the thin film display screen. In that embodiment, a side mount camera 470 may be used or, alternatively one or more parts of the vision system may be located on the front surface of the information handling system.

Free space gesture 428 corresponds to a cursor movement 429 by way of virtual I/O control using the gesture detection system and the methods described herein. Images of the free space gesture 428 are detected and captured by the vision system side mount camera 470 and image sensor 471 for interpretation and transformation into cursor control commands.

As with the embodiment of FIG. 3, the free space gestures 428 may be made in relation to a free space gesture plane established via a 3D side mount camera 470 or via a 2D side mount camera. The gesture detection system and virtual I/O hub may establish and calibrate a gesture detection plane in the detection zone 471 in free space or based on a detected physical surface such as one that the information handling system 410 is resting on in alternate embodiments.

Figure 5A:
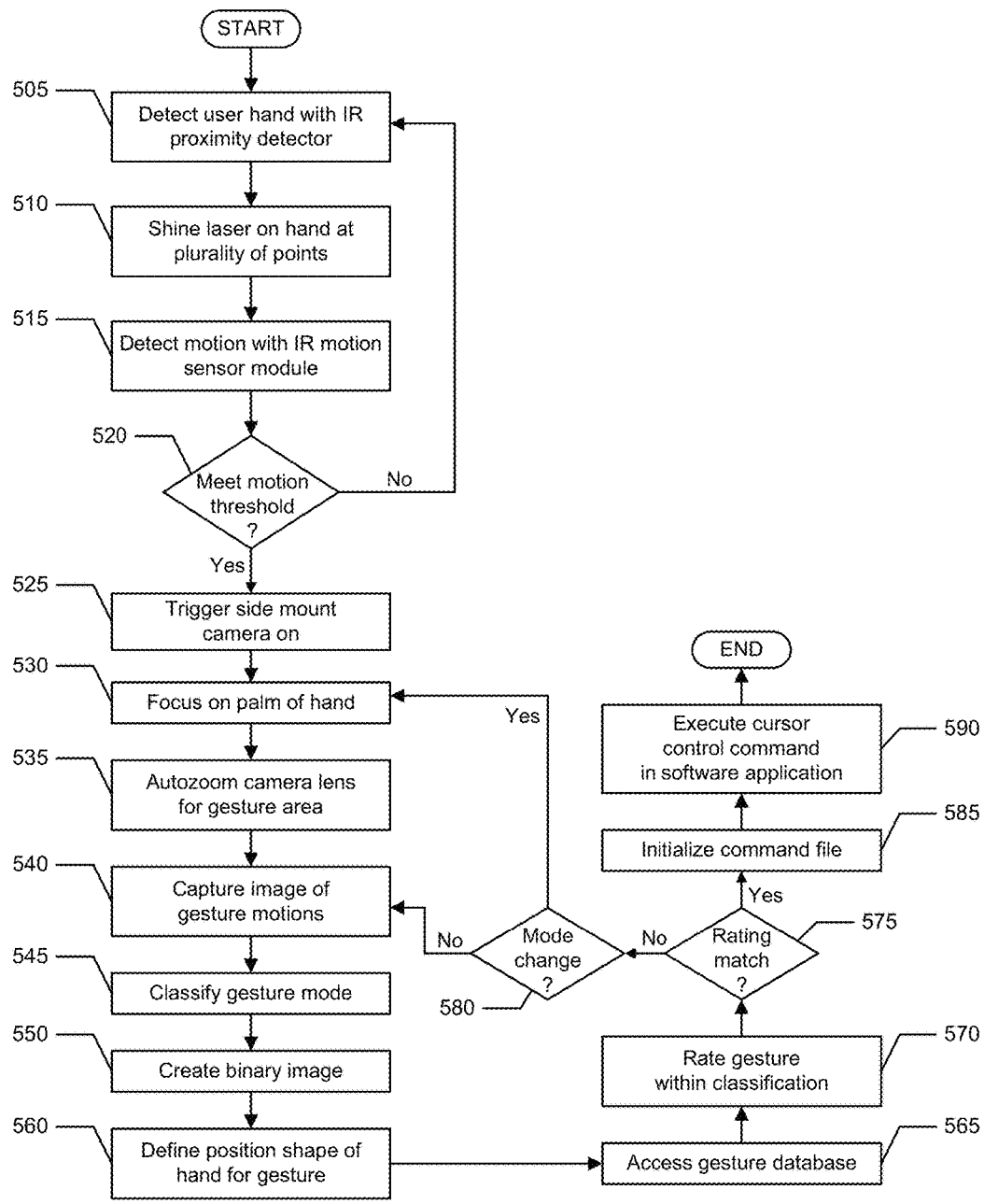
FIG. 5A is flow diagram illustrating an example method for use of a side camera for free space gesture inputs according to an embodiment of the present disclosure.

FIG. 5A shows a flow diagram illustrating a system and method for detecting and capturing free space gestures, interpreting those gestures, and executing commands on a software application running on an information handling system. The process for operating a virtual I/O device hub via a camera capturing images of free space gestures, including a side mounted camera in one embodiment, begins at 505.

At 505, the process begins with detection of a user indication device such as the user's hand, in the free space gesture detection zone. In the currently described embodiment, the user indication device is a user's hand, however it is understood that other user indication devices may be used with the same method and system components. Additionally, in the current embodiment, the camera is a side mounted camera on the information handling system although the camera may be mounted elsewhere in alternate embodiments. An IR motion sensor module may be integrated with the side mount camera, image sensor, or as a separate device. The IR motion sensor module detects proximity of a user's hand. Proceeding to 510, a laser projection system may shine laser light at a plurality of points into the free space gesture detection zone. For example, one or more points of laser light may be projected onto the user's hand. The laser light points are used for reference and detection of movements by the user's hand in the gesture detection zone. At 515, an IR camera may be triggered in the IR motion sensor module to detect the light points for movement characteristics such as direction, velocity, and acceleration based on changes between the plurality of points of laser light.

Proceeding to decision diamond 520, it is determined whether a motion threshold has been met. Should one of the movement characteristics meet a threshold level, such as velocity, then the system proceeds to 525 to trigger the camera, such as a side mount camera embodiment, to activate and initialize a free space gesture plane and capture of free space gesture images relative to that plane. Threshold velocity in one specific embodiment may be approximately one foot/second. It is understood that any thresholds of velocity, acceleration, and/or direction may be selected. Additionally, the direction component, as detected, may impact the calculation of velocity or detection between capture points of light by the IR motion sensor module. In other words, perspective of light on a user's hand moving away from the IR camera will have a different impact than one of a user's hand moving perpendicularly with respect to the IR camera.

If no motion threshold is met, the method returns to 505 until the proximity of a user indication device is detected. If a threshold of motion is met and the system proceeds to 525, the camera is initialized to capture images of free space gestures. At 525, the system determines a virtual gesture detection plane as described above within the gesture detection zone in the present embodiment. The gesture detection plane may be aligned with a flat surface if one is detected next to the information handling system as described above.

Figure 5B:
FIG. 5B illustrates an image capture of a user's hand with focus on portions of the user's hand involved in free space gesture according to an embodiment of the present disclosure.

The flow proceeds to 530, where the system focuses on the palm of the user's hand. The free space gesture detection system determines the boundaries of the palm, fingers and other relevant parts of the user's hand for free space gestures. In alternative embodiments, this may be focus on the user's finger tips for a virtual touchpad mode or the end of a pen, pencil or stylus for a stylus mode. An example of the gesture detection software and images determining the user's palm, fingers, or hand outline is shown in FIG. 5B. At 535, the zoom of the camera is adjusted to provide an area of image capture larger than the size of the user's hand or other user indication device for gestures. This may be done by increasing the view field for gesture detection by a certain amount. In the example embodiment, the increase may be 20%. This will establish preliminary parameters for a virtual working boundary for the free space gestures by the user's hand or other gesture indication device. In one example embodiment, the gesture detection plane may be calibrated at this point for pitch and angle and have some virtual workspace boundaries applied to it. However, the view field, and virtual working boundary, may be incrementally adjusted depending on size of the gesture indication device used or the size of the free space gesture motions made by the user.

At 540, the side mount camera of the vision system captures one or more images of the free space gesture motion. This image capture is used at 545 to classify the gesture. For example, a palm slide free space gesture, a virtual click or virtual double click with one finger and a palm on a virtual gesture detection plane may indicate a virtual mouse mode. Additionally, a palm on gesture detection plane with a virtual single finger scroll gesture may indicate a virtual mouse mode. A single finger or two fingers on a gesture detection plane may indicate a virtual track pad mode in another embodiment. Additional classifications may include whether a left or right hand is being used for free space gestures, among others discussed above. It is understood, that the system may at any time during the process detect a free space gesture indicating a different gesture mode and switch classifications.

Once the gesture mode is determined at 545, the gesture detection system may create a binary image of the gesture images 550. Proceeding to 560, the binary image may be defined for the position shape of the hand gesture accounting for tilt or roll of the hand position. The position of the hand will affect the shape in images of the free space hand gesture captured. The free space gesture detection system will need to account for these factors in calibrating a virtual gesture detection plane and the shape of the user's hand or other user indication device in the captured images when interpreting the gestures.

At 565, the gesture database is accessed for the classified gesture mode determined at 545. The gesture detection system rates the gesture in comparison with data from the gesture database at 570. The rating is a score of similarity with gestures stored for gesture mode classifications. For example, when an index finger is detected going up and down and back and forth in a virtual click or scroll type action, this may score well with a virtual mouse mode. If a palm is further detected virtually resting or sliding along a virtual gesture detection plane, then this further scores a better rating for corresponding to virtual mouse mode. If on the other hand, only a finger tip or plural fingertips are detected in planar movement along a gesture detection plane, but no palm rest, then this will score a good rating for a virtual touchpad mode. The gesture database may include several critical modes and include a learning component based on a virtual machine learning scheme to interpret gestures or variations on gestures to correspond to particular modes for one or more users of the information handling system. In this way, the gesture mode selection may become more efficient over time. The mode selection may also be based on contextual information such as the software application running on the information handling system or the physical orientation of the information handling system.

To proceed, the comparison rating with a stored gesture indication must meet a score threshold level. If the rating is high enough to meet a threshold level for a gesture within the mode of gesture classification, then the free space gesture is determined to have been indicated by the user at decision diamond 575.

If no rating match has been made at decision diamond 575, the flow proceeds to decision diamond 580 to determine if the free space gesture indicates a different gesture mode classification in the present embodiment. Timing of reclassification of gesture mode can be reevaluated at several points in the process in alternative embodiments. If not a new mode, the flow feeds back to 540 to capture additional gesture images. If it does indicate a mode change for free space gestures by the user, the flow proceeds back to 530 where the camera will re-focus for the different mode. For example, the focus at 530 will be on the palm for virtual mouse mode, finger tips for virtual track pad mode, or adjust focus for left or right hand.

Upon meeting a threshold level at decision diamond 575 such that a free space gesture rating matches sufficiently with a gesture from the gesture mode database, the flow proceeds to 585. At 585, the system initializes a command file associated with that stored gesture. In the presently described embodiment, the command file involves cursor control commands for use with a running software application on the information handling system. Proceeding to 590 the system executes the cursor control command in the running software application. At this point the flow ends, however while the side mount camera or other gesture detection camera is on and the gesture detection system is operating, the process is proceeding from 525 for capture of a new gesture or determining a new gesture mode classification as described above. The gesture detection system and vision system are actively seeking to capture free space gesture images for interpretation during operation after the gesture detection system and vision system have been initialized.

Figure 6:
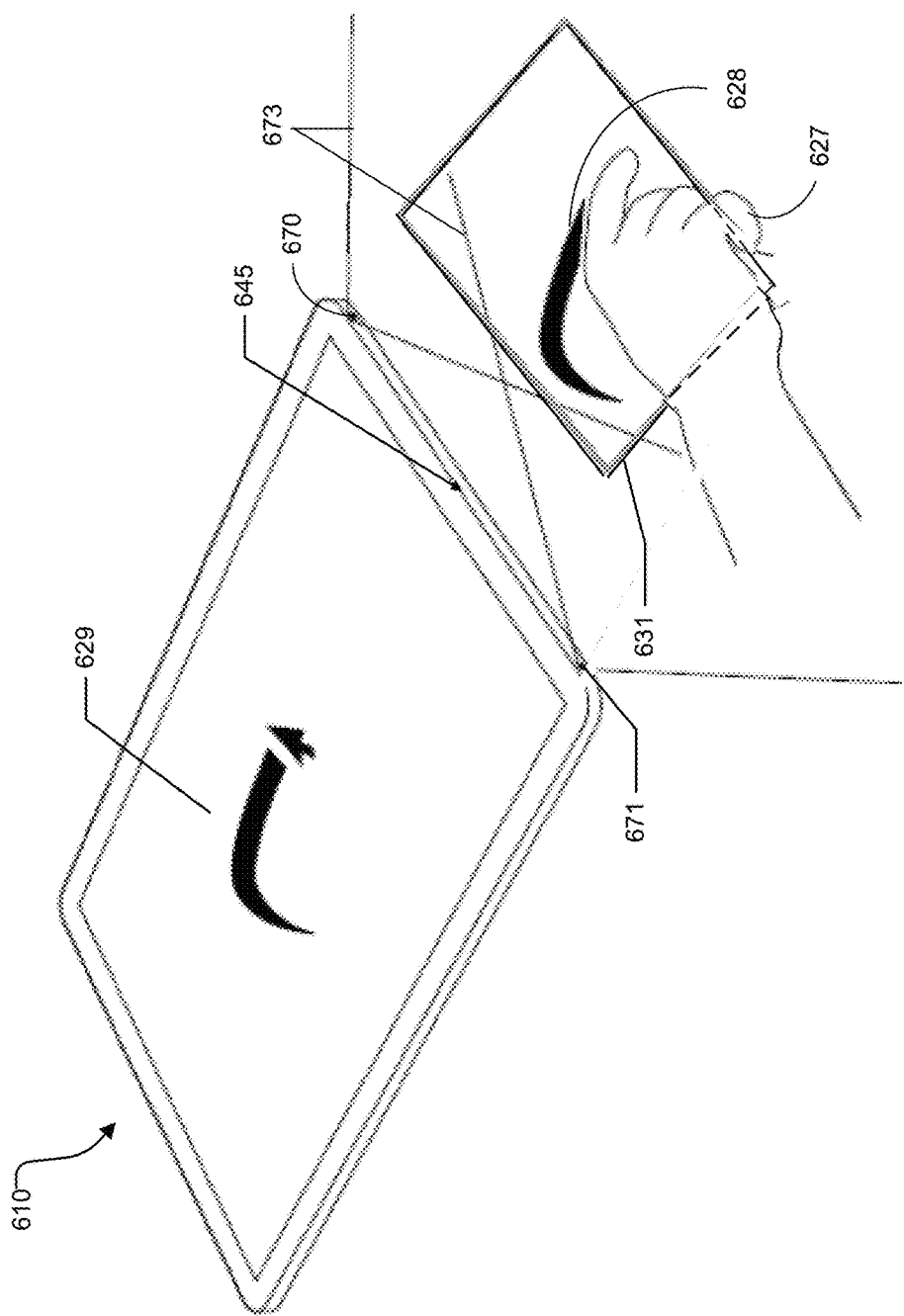
FIG. 6 illustrates another example information handling system with side camera and projection of an opto-virtual free space gesture plane in a detection zone according to an embodiment of the present disclosure.

FIG. 6 shows yet another example of an information handling system 610 with side mount camera 670 and image sensor 671. FIG. 6 is not drawn to scale. For example, the size of the camera and proximity of the side mount camera 670 and image sensor 671 may vary and the location these elements may be changed or altered to the opposite side of the information handling system 610 as is understood by one of ordinary skill in the art. The detection zone 673 is shown to the side of the information handling system 610, but may be located on either the right side, left side, hover center, or at another location selected to be before the camera 670 and image sensor 671 of the vision system. Additional aspects of the vision system in this embodiment include the IR motion sensor module (not shown) and laser projection module 645. In the current embodiment, the laser projection module 645 projects an opto-virtual projection plane 631 to represent the virtual working boundaries of the gesture detection plane for the user.

In an example embodiment, the laser projection module 645 uses a green lasing system to project the opto-virtual projection plane 631 since such solid state lasers may be most power efficient, however any type of laser for the laser projection module 645 is contemplated. Additionally, the opto-virtual projection plane 631 may increased and decreased in size to accommodate hand size of the user. For example, depending on hand size of the user or size of the user indication device 627. The system may detect the user indication device 627, and alter the opto-virtual projection plane 631 by increments depending on varying size of the user indication device 627. In one embodiment, the size of the opto-virtual projection plane 631 may be altered in size area increments of 20% where the size of the opto-virtual projection plane 631 should approximately correspond to boundaries of gesture detection relative to a gesture detection plane. In an example embodiment, the boundaries may be limited to be large enough to provide for ample free space gesture movement, but not be too large to require detection of an inefficiently large area.

The user indication device 627, in the shown embodiment the user's hand, is shown performing a free space gesture 628. In one embodiment, the side mount camera 670 is located along a side edge of an example tablet computer. The side mount camera 670 may be located on either the left, right, top, or bottom side edge. In an alternative embodiment, the free space gestures may be made in space at the center of the information handling system 610, for example over the thin film display screen. In that embodiment, a side mount camera 670 may be used or, alternatively the vision system may be located on the front surface of the information handling system such as in the thin panel display housing.

Free space gesture 628 corresponds to a cursor movement 629 by way of virtual I/O control using the gesture detection system and the methods described herein. Images of the free space gesture 628 are detected and captured by the vision system side mount camera 670 and image sensor 671 for interpretation and transformation into cursor control commands.

Figure 7:
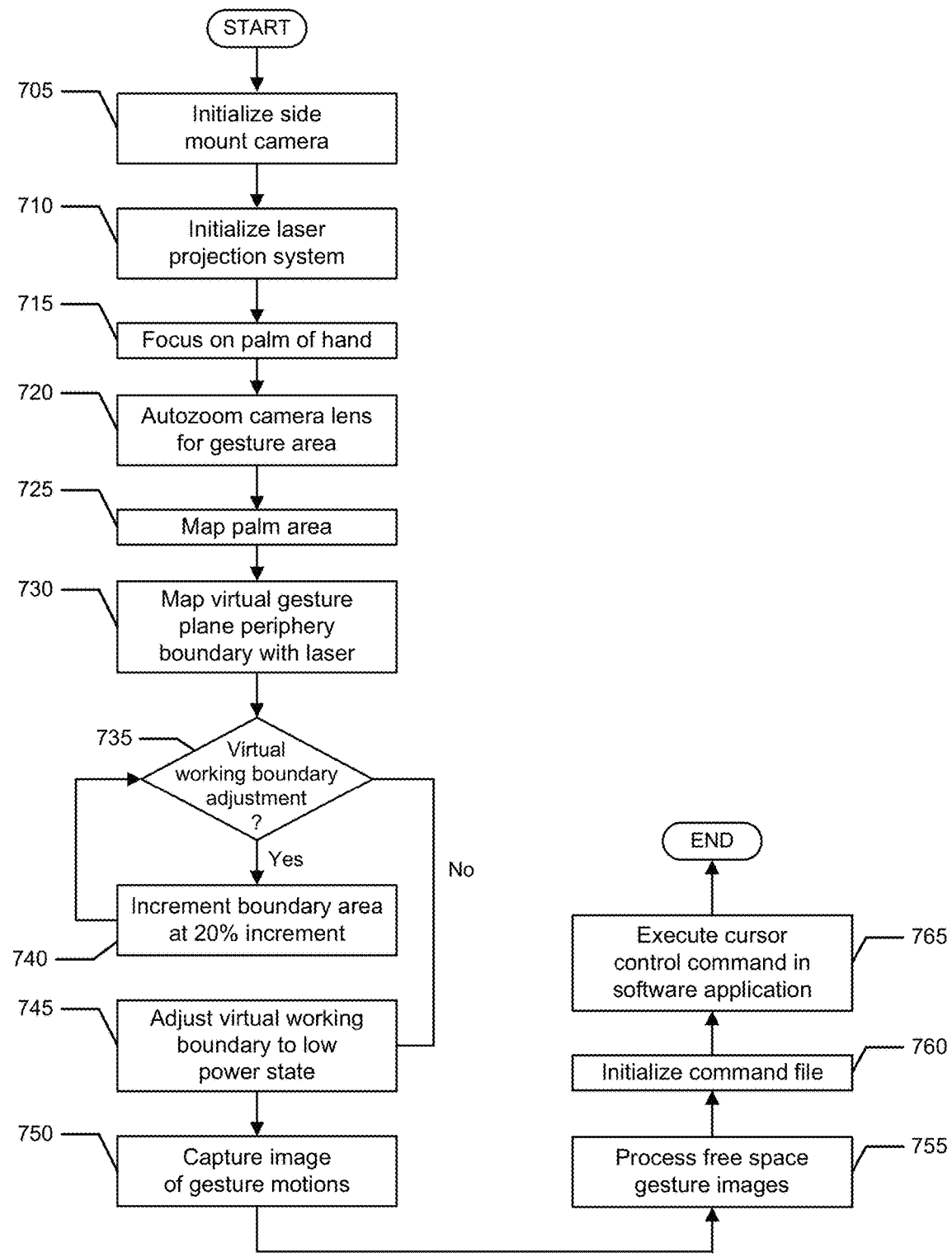
FIG. 7 is a flow diagram illustrating another example method for use of a side camera for free space gesture inputs according to an embodiment of the present disclosure.

FIG. 7 shows a flow diagram illustrating method for detecting and capturing free space gestures, interpreting those gestures, executing commands on a software application running on an information handling system, and projecting an opto-virtual projection plane such as the one described for FIG. 6 for the free space gestures. The process for operating a virtual I/O device hub via a camera capturing images of free space gestures and a laser projection module, including an embodiment where one or both of the camera and laser projection module may be side mounted, begins at 705.

At 705, the process begins with initialization of a gesture detection camera. This may be a side mounted camera in one embodiment of the present disclosure. Initialization may occur via detection of a user indication device such as the user's hand, in the free space gesture detection zone as described for FIG. 5. Proceeding to 710, a laser projection system is initialized. In this embodiment, the laser projection system may be used to project an approximate boundary on a virtual gesture detection plane for use by a user. At 715, the system focuses on the palm of the user's hand, finger, or other relevant component of a user indication device. The free space gesture detection system determines the boundaries of the palm of the user's hand and/or finger(s). In alternative embodiments, this may be focus on the user's finger tips for a virtual touchpad mode or the end of a pen, pencil or stylus for a stylus mode. Upon capturing location of the user's palm or of another relevant part of a user indication device for gestures, the system determines a virtual gesture detection plane as described above within the gesture detection zone. The gesture detection plane may be aligned with a flat surface if one is detected next to the information handling system as described above.

The flow proceeds to 720, where the zoom of the camera is adjusted to provide an area of image capture larger than the size of the user's hand or other user indication device. This may be done by increasing the view field for gesture detection by a certain amount. The gesture detection system then maps the palm area relative to the virtual gesture detection plane. With this information, and partly based on the view field of the side mount camera and secondary image detection device used to capture gestures, the gesture detection system maps the virtual gesture detection plane periphery at 730. Initial free space gesture processing will also take place in that classification of the gesture mode will occur by the gesture detection system. The gesture mode is relevant to the virtual working boundary and gesture detection plane. Data for the above several factors will establish an approximate but adjustable type of virtual working boundary for the free space gestures by the user's hand or other gesture indication device. In one example embodiment, the gesture detection plane may be calibrated at this point. Calibration of the gesture detection plane may account for pitch and angle of free space gesture motions. Additionally, the free space gesture plane may have some virtual workspace boundaries applied to it. These virtual working boundaries may be based in part on the view field of the camera as described above. However, the working boundary may be incrementally adjusted depending on size of the gesture indication device used or the size of the free space gesture motions made by the user. Also at 730, the approximate boundary is then defined for laser projection to provide a visual approximate boundary for the user.

Proceeding to decision diamond 735, the gesture detection system determines whether an approximate working virtual boundary must be adjusted due to a change in mode or a different size of user indication device or size of gesture motions. If an adjustment is needed to keep an approximate working virtual boundary of appropriate size to capture free space gestures for the gesture mode, the gesture detection system will incrementally modify the virtual working boundary area at 740. In the present embodiment, the increment is changed at a 20% change, but other incremental changes are contemplated. For example, if a mode change precipitates a change in the virtual working boundary for gestures, the system may adjust to a default starting size for the new gesture type. Particular example embodiments of modes may include a different default size for the virtual working boundary on the gesture detection plane. For example, a virtual trackpad mode or virtual stylus mode may have a different default boundary size than a virtual mouse mode. If a mode change for free space gestures by the user is required, the camera will re-focus for the different mode. For example, the focus at 720 will be on the palm for virtual mouse mode, but on finger tips for virtual track pad mode, a stylus pen tip, or adjust focus for left or right hand in certain example embodiments. Size of the virtual working boundary area relative to the focus on the relative user indication device will be specific to make the virtual working boundary useful for a given gesture classification mode.

Upon making the incremental change at 740, flow returns to decision diamond 735 to determine if another adjustment must be made. However, the gesture detection method may reassess whether an adjustment is necessary to the virtual working boundary any time a change is made to the gesture mode, the user indication device, or another substantial change is detected in the gesture detection zone. The gesture detection system maintains a vigilance for necessary changes to the gesture mode or to the virtual working boundary.

If no adjustment of virtual working boundary size is needed, the flow proceeds to 745 where the projected virtual working boundary is reduced to a low-power state in an example embodiment to save battery power. The flow proceeds to 750, where the gesture detection system capture gesture images with the side mount camera and image detector of the vision system. At 755, the gesture detection system processes the free space gestures images with ratings to determine if a cursor control command or other command corresponds to the free space gesture. Example embodiments of the free space virtual image are described above.

The gesture detection system initializes a command file associated with that stored gesture at 760. In the presently described embodiment, the command file involves cursor control commands for use with a running software application on the information handling system.

Proceeding to 765 the system executes the cursor control command in the running software application. At this point the flow ends, however while the side mount camera or other gesture detection camera is on and the gesture detection system is operating, the process is proceeding continues to monitor new free space gestures for additional gestures. Also, the gesture detection system continues to determine whether a new gesture requires a change in mode classification or modification to the projected working virtual boundary as adjustments are necessary described above. The adjustments to the projected virtual working boundary for free space gestures and the gesture detection plane is minimized to avoid disruption to the user in one embodiment. Clear changes in gesture classification mode, replacement of a user indication device, or other clear change will trigger a virtual boundary adjustment once the system has been continuously operating to interpret a series of free space gesture. The gesture detection system and vision system are actively seeking to capture free space gesture images for interpretation during operation after the system has been initialized. The gesture detection system and laser projection of virtual working boundary may have a sleep mode to save battery power after a time period of inactivity in yet another embodiment.

The system and methods described in the embodiments above may comprise processor executable instructions stored in computer-readable medium. The main memory unit 109 and disk drive unit 110 may include a computer-readable medium in which one or more sets of instructions such as software can be embedded. The disk drive unit 110 also contains space for data storage. Further, the instructions may embody one or more of the methods or logic as described herein. In a particular embodiment, the instructions may reside completely, or at least partially, within main memory 109, the static memory or disk drive unit 110, and/or within the processor chipset(s) 108 during execution by the system 10. The main memory 109 and the processor chipset 108 also may include computer-readable media. The network interface device 40 can provide connectivity to a network 50, (e.g. a wide area network (WAN)), a local area network (LAN), wireless network, or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium of main memory 109 and static memory or drive unit 110 that includes instructions or receives and executes instructions responsive to a propagated signal; so that a device connected to a network interface device 40 can communicate voice, video or data over the network 50. Further, the instructions may be transmitted or received over the network 50 via the network interface device 40.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system having a free space gesture detection system comprising:
    a housing;
    a camera mounted in the housing and oriented to detect gestures by a user in a gesture detection zone adjacent to the information handling system;
    a free space gesture detection system executing instructions on a processor determining available gesture commands for a software application operating on the information handling system;
    the free space gesture detection system detecting gestures in a virtual gesture detection plane, the virtual gesture detection plane calibrated to a location of a user's hand on a location and tilt angle of an assigned virtual working surface; and the processor accessing a gesture database and rating the detected gestures in the virtual gesture detection plane to correspond to a gesture classification.

2. The system of claim 1, further comprising:
the assigned virtual working surface corresponding to a location and tilt angle of a detected physical working surface in the gesture detection zone.

3. The system of claim 1, further comprising:
the assigned virtual working surface having an established location and tilt angle in space adjacent to the information handling system assigned by the free space gesture detection system in the gesture detection zone.

4. The system of claim 1, further comprising:
the detected gestures by the free space gesture detection system initializing commands corresponding to the determined gesture classification.

5. The system of claim 1, further comprising:
a second camera for detecting depth for calibration of the virtual gesture detection plane.

6. The system of claim 1, further comprising:
an orientation sensor for detecting orientation of the information handling system relative to calibrating the virtual gesture detection plane to the location of the user's hand on the assigned virtual working surface.

7. The system of claim 6, further comprising:
a display device that may be oriented in any orientation relative to the virtual gesture detection plane and the location of the user's hand.

8. The system of claim 1, wherein the free space gesture detection system detects palm or finger elements of a user's hand in the virtual gesture detection plane to sense cursor control movements.

9. The system of claim 1 wherein the information handling system is a laptop computer.

10. A computer-implemented a free space gesture detection method comprising:
detecting, via camera mounted in the housing and oriented to detect gestures by a user in a gesture detection zone, gestures by a user in a gesture detection zone adjacent to the information handling system;
determining, via a processor executing instructions, available gesture commands for a software application operating on the information handling system;
detecting gestures in a virtual gesture detection plane, the virtual gesture detection plane calibrated to a location of a user's hand on a location and tilt angle of an assigned virtual working surface; and
accessing a gesture database and rating the detected gestures in the virtual gesture detection plane to correspond to a gesture classification. to correspond to cursor control commands in the software application operating on the information handling system.

11. The method of claim 10, further comprising:
initializing commands corresponding to the determined gesture classification based on the detected gestures.

12. The method of claim 10, further comprising:
assigning an location and tilt angle in space adjacent to the information handling system in the gesture detection zone as an assigned virtual working surface.

13. The method of claim 10, wherein establishing the virtual gesture detection plane includes sensing and adjusting depth calibration to changes in the location of a user's hand relative to the assigned virtual working surface via a second camera.

14. The method of claim 10, further comprising:
detecting orientation of the information handling system, via orientation sensors, to calibrate the virtual gesture detection plane to the location of the user's hand relative to a tilt angle of the camera mounted in information handling system.

15. The method of claim 10, further comprising:
detecting palm and finger elements of a user's hand in the virtual gesture detection plane to sense virtual mouse movements including virtual finger clicks and finger scroll movement.

16. The method of claim 10, further comprising:
detecting a finger element of a user's hand in the virtual gesture detection plane to sense virtual track pad input movements.

17. An information handling system having a free space gesture detection system comprising:
a housing;
a camera mounted in a housing of the information handling system and oriented to detect gestures by a user in a gesture detection zone adjacent to the information handling system;
a free space gesture detection system executing instructions on a processor determining a virtual gesture detection plane in the gesture detection zone;
a free space gesture detection system executing instructions on a processor and detecting gestures in the virtual gesture detection plane, the virtual gesture detection plane calibrated to a location of a user's hand on a location and tilt angle of an assigned virtual working surface assigned by the free space gesture detection system in the gesture detection zone;
an orientation sensor for detecting orientation of the information handling system and camera relative to the location and tilt angle of the assigned virtual working surface; and
the processor accessing a gesture database and rating the detected gestures in the virtual gesture detection plane to correspond to a gesture classification.

18. The system of claim 17, further comprising:
the assigned virtual working surface corresponding to a location and tilt angle of a detected physical working surface in the gesture detection zone.

19. The system of claim 17, wherein the free space gesture detection system detects the software application running on the information handling system and determines available gesture commands for use with the software application.

20. The system of claim 17, further comprising:
the free space gesture detection system interpreting detected gestures via a gesture classifier comparing the detected gesture with a gesture database via the processor.

* * * * *